US007640093B2

(12) United States Patent
Watanabe et al.

(10) Patent No.: US 7,640,093 B2

(45) Date of Patent: Dec. 29, 2009

(54) ELECTRONIC THROTTLE CONTROL APPARATUS

(75) Inventors: Shinji Watanabe, Chiyoda-ku (JP); Takayuki Yano, Kobe (JP); Akihiro Iwamoto, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/258,924

(22) Filed: Oct. 27, 2008

(65) Prior Publication Data

US 2009/0288635 A1 Nov. 26, 2009

(30) Foreign Application Priority Data

May 22, 2008 (JP) ............................ 2008-133820

(51) Int. Cl.
*B60T 7/12* (2006.01)
*F02D 1/00* (2006.01)

(52) U.S. Cl. ...................... 701/103; 123/399; 123/350; 123/361

(58) Field of Classification Search ................. 701/103, 701/104, 105, 114, 115; 123/339.14, 396, 123/397, 398, 399, 400, 403, 319, 344, 349, 123/350, 352, 361, 376
See application file for complete search history.

(56) References Cited

U.S. PATENT DOCUMENTS 5,406,920 A * 4/1995 Murata et al. ............... 123/399
5,477,826 A * 12/1995 Hara et al. ............. 123/339.16
5,524,724 A * 6/1996 Nishigaki et al. ........... 180/176
6,647,959 B2 * 11/2003 Noguchi ..................... 123/396
7,017,550 B2 * 3/2006 Hata et al. .................. 123/399
7,171,946 B1 * 2/2007 Watanabe ................... 123/399
7,434,565 B2 * 10/2008 Miyachi ..................... 123/399
2006/0060168 A1 * 3/2006 Watanabe et al. ........... 123/399
2007/0027609 A1 * 2/2007 Watanabe ................... 701/114

FOREIGN PATENT DOCUMENTS

JP 3713998 B2 8/2000

* cited by examiner

*Primary Examiner*—John T Kwon
(74) *Attorney, Agent, or Firm*—Sughrue Mion, PLLC

(57) ABSTRACT

In order to obtain an electronic throttle control apparatus capable of forcibly turning a throttle valve from a full-close position toward an opening side by a predetermined opening degree to place the throttle valve in a desired opening degree position, the electronic throttle control apparatus includes: a throttle opening degree sensor for detecting an opening degree position of a throttle valve; a throttle actuator that opens and closes the throttle valve; a first target opening degree position setting unit for setting a first target opening degree position; throttle opening degree feedback control unit that performs feedback control on the throttle valve; a throttle valve full-close position judgment unit for judging whether or not the throttle valve is being urged in a direction to be closed at a full-close position; a second target opening degree position setting unit for setting a second target opening degree position; and a target opening degree position switching unit that switches a signal to be input to the throttle opening degree feedback control unit from the first target opening degree position to the second target opening degree position.

14 Claims, 11 Drawing Sheets

ELECTRONIC THROTTLE CONTROL APPARATUS

BACKGROUND OF THE INVENTION

1. Field of the Invention

The present invention relates to an electronic throttle control apparatus including a throttle opening degree feedback control means for feedback control of a throttle valve by using an opening degree position detected by a throttle opening degree sensor.

2. Description of the Related Art

An electronic throttle control apparatus including a throttle opening degree sensor, a throttle actuator having a motor, a target opening degree position setting means, and a throttle opening degree feedback control means is conventionally known (for example, see Japanese Patent No. 3713998; hereinafter, referred to as Patent Document 1). In the electronic throttle control apparatus described in Patent Document 1, the throttle opening degree sensor detects an opening degree position of a throttle valve which is closed and opened to adjust an amount of intake air sucked into an engine. The throttle actuator opens and closes the throttle valve by energization of the motor. The target opening degree position setting means sets a target opening degree position of the throttle valve in response to a signal output from a control means of the engine. The throttle opening degree feedback control means receives an input of the opening degree position from the throttle opening degree sensor and an input of the target opening degree position from the target opening degree position setting means and performs feedback control on the throttle valve to match the opening degree position and the target opening degree position with each other.

In the case of the disclosed electronic throttle control apparatus, for the engine start, after a current larger than a reference value is made to flow through the motor for a predetermined period of time to place the throttle valve in a full-close position, a value of the current made to flow through the motor is reduced to be smaller than the reference value to turn the throttle valve from the full-close position toward the opening side by a predetermined opening degree. In this manner, an overcurrent is prevented from flowing through the motor, while the size of particles of a fuel is reduced to improve fuel efficiency.

In the above-mentioned conventional electronic throttle control apparatus, however, the current flowing through the motor and the opening degree position of the throttle valve have a hysteresis relation. Therefore, even when the throttle valve is at the same opening degree position, the current required for the motor differs for each driving direction.

As a result, it is still difficult to turn the throttle valve from the full-close position toward the opening side by a predetermined opening degree to place the throttle valve in a desired opening degree position only by performing open-loop control to make the current flowing through the motor smaller than the reference value.

SUMMARY OF THE INVENTION

The present invention is devised to solve the problem as described above, and has an object of providing an electronic throttle control apparatus capable of forcibly turning a throttle valve from a full-close position toward an opening side by a predetermined opening degree to place the throttle valve in a desired opening degree position.

The electronic throttle control apparatus according to the present invention includes: a throttle opening degree sensor that detects an opening degree position of a throttle valve which opens and closes to adjust an amount of air sucked into an engine; a throttle actuator including a motor, the throttle actuator being for opening and closing the throttle valve by energization of the motor; a first target opening degree position setting means that sets a first target opening degree position of the throttle valve in response to a signal from a control means of the engine; a throttle opening degree feedback control means that receives an input of the opening degree position detected by the throttle opening degree sensor and an input of the first target opening degree position from the first target opening degree position setting means to perform feedback control on the throttle valve to match the opening degree position and the first target opening degree position with each other; a throttle valve full-close position judgment means that judges whether or not the throttle valve is being urged in a direction to be closed at a full-close position; a second target opening degree position setting means that sets a second target opening degree position obtained by adding a first predetermined opening degree to a detected full-close position detected by the throttle opening degree sensor when the throttle valve full-close position judgment means judges that the throttle valve is being urged in the direction to be closed at the full-close position; and a target opening degree position switching means that receives an input of the first target opening degree position from the first target opening degree position setting means and an input of the second target opening degree position from the second target opening degree position setting means to switch a signal to be input to the throttle opening degree feedback control means from the first target opening degree position to the second target opening degree position, in which, when the throttle valve full-close position judgment means judges that the throttle valve is being urged in the direction to be closed at the full-close position, the throttle opening degree feedback control means performs the feedback control on the throttle valve to match the opening degree position and the second target opening degree position with each other by the target opening degree position switching means.

According to the electronic throttle control apparatus of the present invention, when the throttle valve full-close position judgment means judges that the throttle valve is being urged in the direction to be closed at the full-close position, the throttle opening degree feedback control means performs the feedback control on the throttle valve to match the opening degree position and the second target opening degree position with each other to forcibly turn the throttle valve from the full-close position toward the opening side by the predetermined opening degree, thereby placing the throttle valve in the desired opening degree position.

DETAILED DESCRIPTION OF THE PREFERRED EMBODIMENTS

Figure 1:
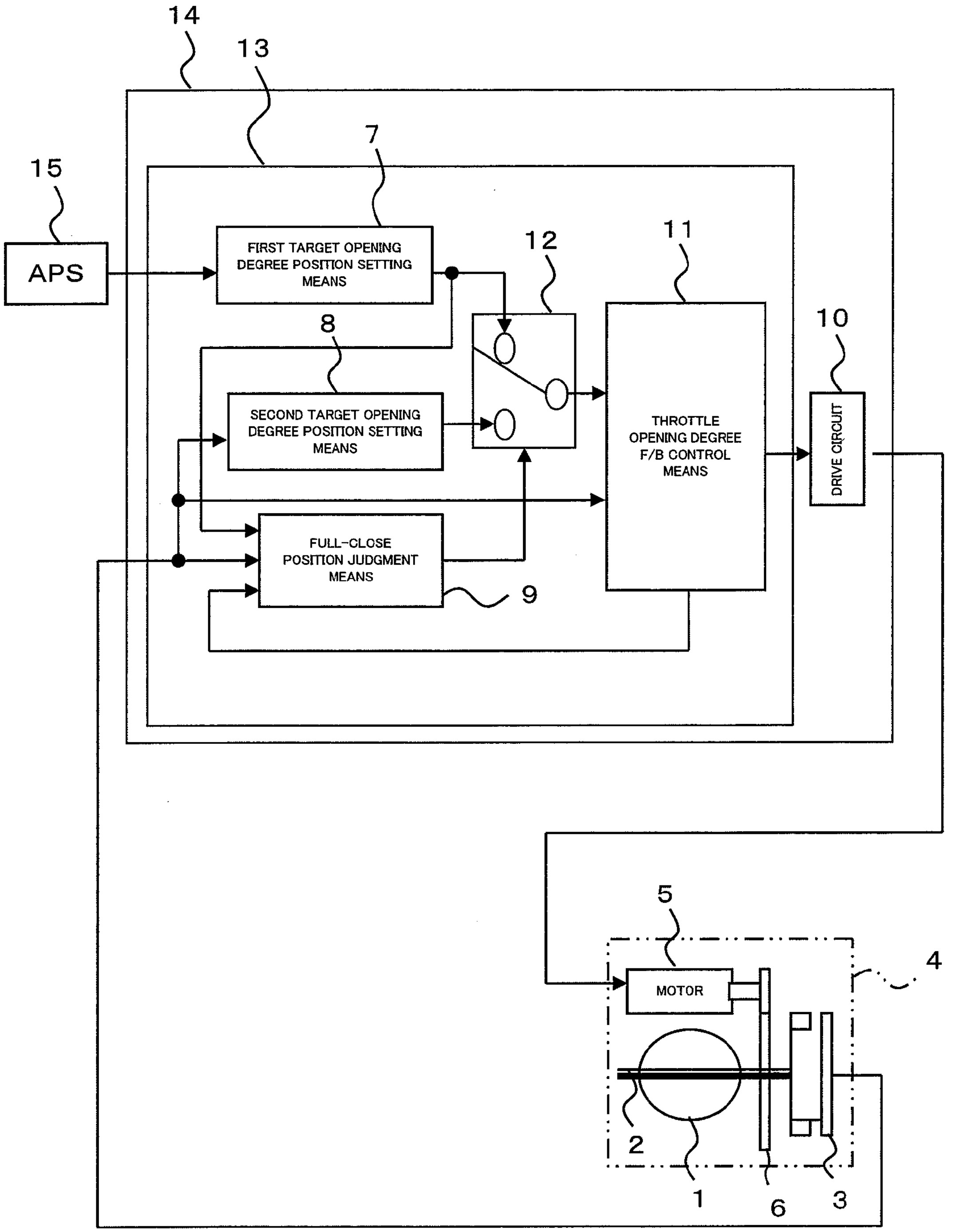
FIG. 1 is a block diagram illustrating an electronic throttle control apparatus according to a first embodiment of the present invention.

Hereinafter, exemplary embodiments of the present invention are described based on the accompanying drawings. In each of the drawings, the same or equivalent members and parts are denoted by the same reference numerals for description.

First Embodiment

FIG. 1 is a block diagram illustrating an electronic throttle control apparatus according to a first embodiment.

The electronic throttle control apparatus according to the first embodiment includes a throttle opening degree sensor 3 and a throttle actuator 4. The throttle opening degree sensor 3 is provided for a throttle shaft 2 of a throttle valve 1 which is opened and closed to adjust the amount of intake air sucked into an engine. The throttle opening degree sensor 3 detects an opening degree position VTP of the throttle valve 1. The throttle actuator 4 is provided for the throttle shaft 2 to open and close the throttle valve 1.

The throttle opening degree sensor 3 includes a first opening degree sensor section (not shown) and a second opening degree sensor section (not shown), each being for detecting the opening degree position VTP of the throttle valve 1.

The first opening degree sensor section and the second opening degree sensor section are mounted onto the throttle valve 1 to have the same characteristics.

However, the first opening degree sensor section and the second opening degree sensor section may also be mounted onto the throttle valve 1 to have opposite characteristics.

The throttle actuator 4 includes a DC motor 5 and a reduction gear 6 for reducing a torque transferred from the DC motor 5 to transfer the reduced torque to the throttle shaft 2.

The electronic throttle control apparatus also includes a first target opening degree position setting means 7, a second target opening degree position setting means 8, a throttle valve full-close position judgment means 9, and a throttle opening degree feedback control means 11. The first target opening degree position setting means 7 sets a first target opening degree position VTT1 of the throttle valve 1, whereas the second target opening degree position setting means 8 sets a second target opening degree position VTT2 of the throttle valve 1. The throttle valve full-close position judgment means 9 judges whether or not the throttle valve 1 is being urged in a direction to be closed at a full-close position. The throttle opening degree feedback control means 11 performs feedback control (PID control) on the throttle valve 1 through a drive circuit 10.

The feedback control is not limited to the PID control, but may also be other types of control.

The electronic throttle control apparatus further includes a target opening degree position switching means 12. When the first target opening degree position VTT1 is input from the first target opening degree position setting means 7 and the second target opening degree position VTT2 is input from the second target opening degree position setting means 8 to the target opening degree position switching means 12, the target opening degree position switching means 12 performs switching between the first target opening degree position VTT1 and the second target opening degree position VTT2 to output the result of switching to the throttle opening degree feedback control means 11.

The first target opening degree position setting means 7, the second target opening degree position setting means 8, the throttle valve full-close position judgment means 9, the throttle opening degree feedback control means 11, and the target opening degree position switching means 12 are provided in a microcomputer 13. The microcomputer 13 and the drive circuit 10 are provided in an electronic control unit (ECU) 14.

The first target opening degree position setting means 7 receives an input of an accelerator opening degree signal of an accelerator position sensor (APS) 15 through an A/D converter (not shown) and an input of a rotation speed signal (not shown) of the engine to set the first target opening degree position VTT1 of the throttle valve 1 based on the accelerator opening degree signal and the rotation speed signal.

The opening degree position VTP of the throttle valve 1 is input from the throttle opening degree sensor 3 through the A/D converter (not shown) to the second target opening degree position setting means 8.

When the throttle valve full-close position judgment means 9 judges that the throttle valve 1 is urged in the direction to be closed at the full-close position, a detected full-close position VTPFC of the throttle valve 1 detected by the throttle opening degree sensor 3 is input to the second target opening degree position setting means 8. The second target opening degree position setting means 8 sets the second target opening degree position VTT2 obtained by adding a first predetermined opening degree C1 (5 mV) to the detected full-close position VTPFC.

The second target opening degree position setting means 8 restricts the second target opening degree position VTT2 to be on a closing side of a first limit opening degree position obtained by adding an upper limit value CLMT for increasing a target opening degree (100 mV) corresponding to a third predetermined opening degree to the detected full-close position VTPFC.

The throttle valve full-close position judgment means 9 receives an input of the first target opening degree position VTT1 from the first target opening degree position setting means 7 and the opening degree position VTP of the throttle valve 1 through the A/D converter (not shown) from the throttle opening degree sensor 3.

The throttle opening degree feedback control means 11 outputs a motor drive duty value DDTY to the drive circuit 10. The motor drive duty value DDTY corresponds to a ratio of an ON time and an OFF time of the current flowing through the DC motor 5, which is used by the drive circuit 10 to drive the DC motor by PWM. Noise is reduced from the motor drive duty value DDTY by a filter (not shown) to obtain a filtered duty value DDTYF. The filtered duty value DDTYF is input to the throttle valve full-close position judgment means 9.

The filtering is performed by computation in the microcomputer 13.

The throttle valve full-close position judgment means 9 includes a full-close urging judgment flag FCFLG indicating whether or not the throttle value 1 is being urged in the direction to be closed at the full-close position. When the throttle valve 1 is being urged in the direction to be closed at the full-close position, the full-close urging judgment flag FCFLG is 1. On the other hand, when the throttle valve 1 is not being urged in the direction to be closed at the full-close position, the full-close urging judgment flag FCFLG is 0.

The throttle valve full-close position judgment means 9 includes a counter CNT1 for counting a time. A value of the counter CNT1 is incremented under a predetermined condition. When the value of the counter CNT1 becomes equal to a predetermined value CNTR (0.5 s), the value of the counter CNT1 becomes zero.

At the engine stop, the throttle valve full-close position judgment means 9 stores a throttle full-close position learning value VTPFCL corresponding to a learned full-close position of the throttle valve 1 detected by the throttle opening degree sensor 3 when the throttle valve 1 is at the full-close position.

A voltage value VB of a battery (not shown) is input from the battery through the A/D converter to the microcomputer 13. The throttle valve full-close position judgment means 9 reads a monitor duty value MDTY preset in a table based on the input voltage value VB of the battery.

The target opening degree position switching means 12 receives an input of a switching signal from the throttle valve full-close position judgment means 9, and then outputs any one of the first target opening degree position VTT1 and the second target opening degree position VTT2 to the throttle opening degree feedback control means 11 based on the received switching signal.

The throttle opening degree feedback control means 11 receives an input of any one of the first target opening degree position VTT1 and the second target opening degree position VTT2 from the target opening degree position switching means 12 and also receives an input of the opening degree position VTP of the throttle valve 1 through the A/D converter (not shown) from the throttle opening degree sensor 3.

Figure 2:
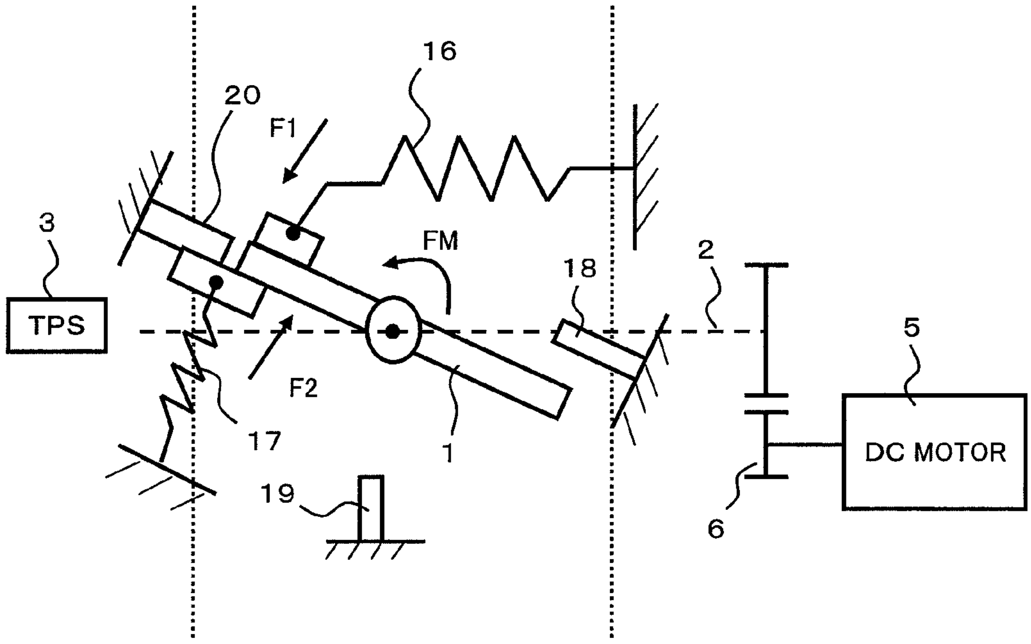
FIG. 2 is an explanatory view illustrating an opening degree position of a throttle valve when no current flows through a DC motor of FIG. 1.
Figure 3:
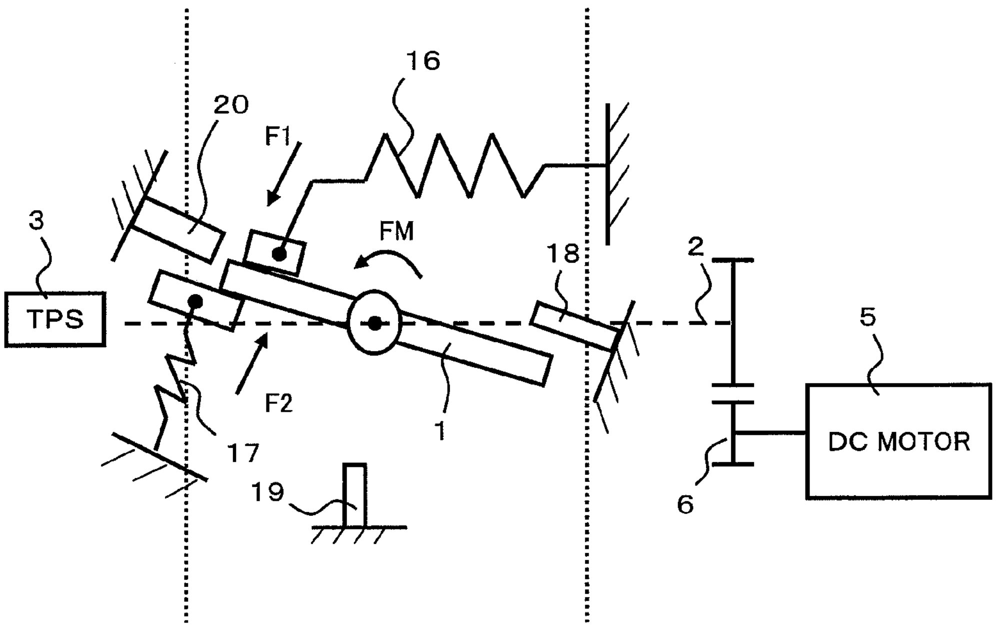
FIG. 3 is an explanatory view illustrating the opening degree position of the throttle valve when a current flows through the DC motor of FIG. 1.

FIG. 2 is an explanatory view illustrating the opening degree position of the throttle valve 1 when no current flows through the DC motor 5 illustrated in FIG. 1, whereas FIG. 3 is an explanatory view illustrating the opening degree position of the throttle valve 1 when the current flows through the DC motor 5 illustrated in FIG. 1.

In an intake path to which the throttle valve 1 is attached, a return spring 16 for biasing the throttle valve 1 in its closing direction and an opener spring 17 for biasing the throttle valve 1 in its opening direction are provided.

In the intake path, a full-close stopper 18, a full-open stopper 19, and a default opening stopper 20 are also provided. The full-close stopper 18 abuts against the throttle valve 1 to place the throttle valve 1 in the full-close position, whereas the full-open stopper 19 abuts against the throttle valve 1 to place the throttle valve 1 in the full-open position. The default opening stopper 20 regulates the biasing of the opener spring 17 in the direction to open the throttle valve 1 when the throttle valve 1 is opened at a predetermined opening degree or larger.

When no current flows through the DC motor 5, a driving force FM is not transferred from the DC motor 5 to the throttle valve 1 while only a biasing force F1 of the return spring 16 and a biasing force F2 of the opener spring 17 are transferred to the throttle valve 1.

The biasing force F2 of the opener spring 17 is set larger than the biasing force F1 of the return spring 16. The opener spring 17 pushes the throttle valve 1 in its opening direction at the position where the opener spring 17 abuts against the default opening stopper 20.

As a result, the throttle valve 1 is placed in the default opening degree position.

When the current is made to flow through the DC motor 5 to generate the driving force FM in a direction of closing the throttle valve 1 while the throttle valve 1 is at the default opening degree position, the driving force FM of the DC motor 5, the biasing force F1 of the return spring 16, and the biasing force F2 of the opener spring 17 are transferred to the throttle valve 1.

When the driving force FM of the DC motor 5 and the biasing force F1 of the return spring 16 become larger than the biasing force F2 of the opener spring 17, the throttle valve 1 is turned in its closing direction to abut against the full-close stopper 18 to be placed in the full-close position.

On the other hand, when the current is made to flow through the DC motor 5 to generate the driving force FM in a direction of opening the throttle valve 1 while the throttle valve 1 is at the default opening degree position, the driving force FM of the DC motor 5 and the biasing force F1 of the return spring 16 are transferred to the throttle valve 1.

When the driving force FM of the DC motor 5 becomes larger than the biasing force F1 of the return spring 16, the throttle valve 1 is turned in its opening direction to abut against the full-open stopper 19 to be placed in the full-open position.

Next, output characteristics of the throttle opening degree sensor 3 are described.

Figure 4:
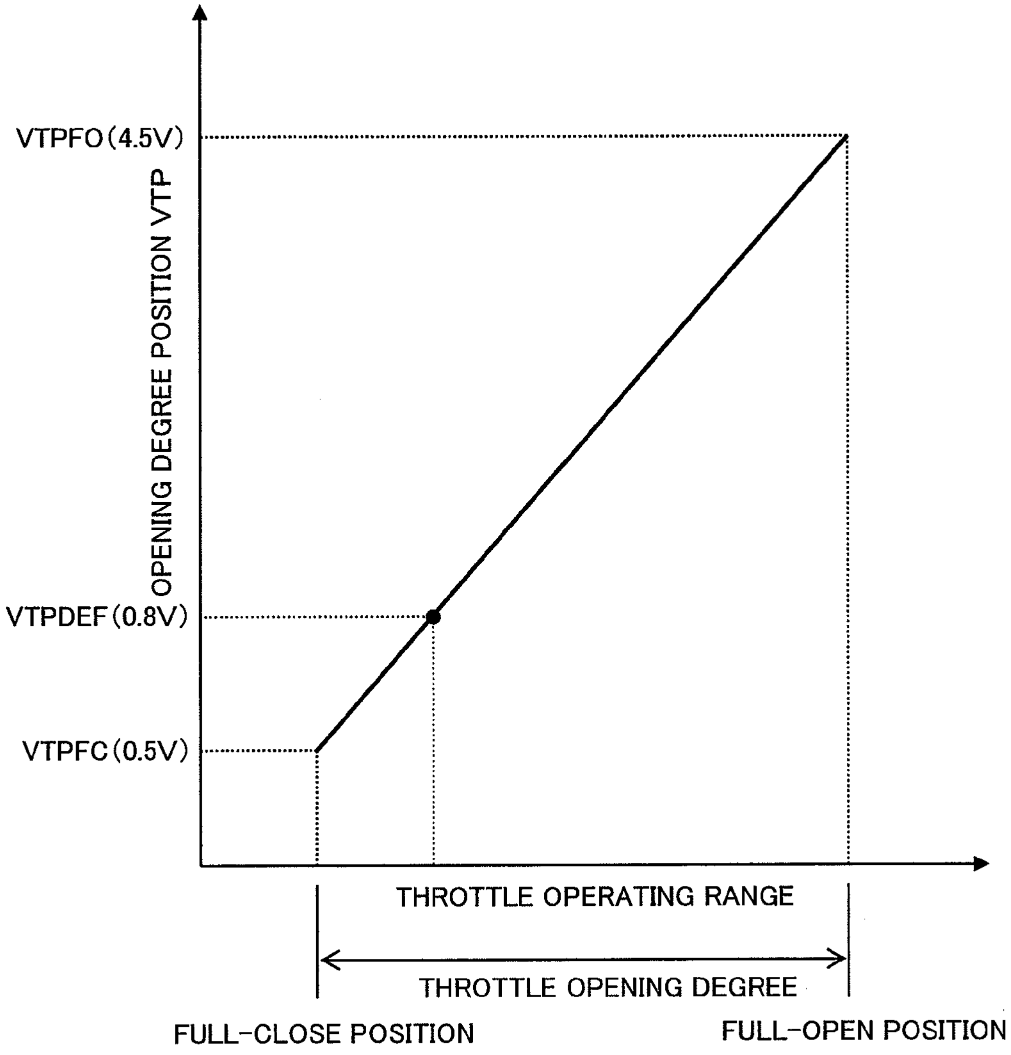
FIG. 4 is a view illustrating output characteristics of a throttle opening degree sensor of FIG. 1.

FIG. 4 is a view illustrating the output characteristics of the throttle opening degree sensor 3 illustrated in FIG. 1.

The opening degree position VTP of the throttle valve 1 detected by the throttle opening degree sensor 3 is the detected full-close position VTPFC (0.5V) when the throttle valve 1 is at the full-close position, is a detected full-open position VTPFO (4.5V) when the throttle valve 1 is at the full-open position, and is a detected default opening degree position VTPDEF (0.8V) when the throttle valve 1 is at the default opening degree position.

Next, the relation between the current flowing through the DC motor 5 and the opening degree position VTP of the throttle valve 1 detected by the throttle opening degree sensor 3 is described.

Figure 5:
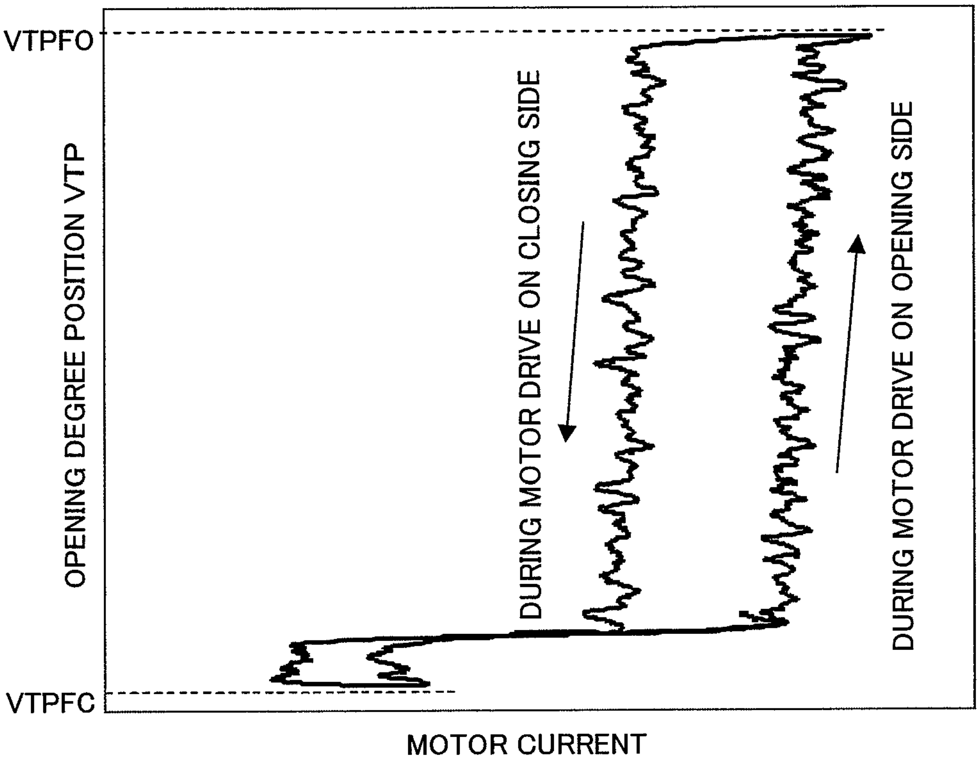
FIG. 5 is a view illustrating a relation between the current flowing through the DC motor of FIG. 1 and the opening degree position of the throttle valve detected by the throttle opening degree sensor.

FIG. 5 is a view illustrating the relation between the current flowing through the DC motor 5 in FIG. 1 and the opening degree position VTP of the throttle valve 1 detected by the throttle opening degree sensor 3.

The current flowing through the DC motor 5 and the opening degree position VTP of the throttle valve 1 detected by the throttle opening degree sensor 3 have a hysteresis relation due to a friction force generated in sliding portions of the reduction gear 6, the return spring 16, and the opener spring 17, a loss torque of the DC motor 5, and the like.

As a result, even when the throttle valve 1 is at the same opening degree position VTP, the current flowing through the DC motor 5 differs depending on the closing/opening direction of the throttle valve 1.

Moreover, since a spring constant of each of the return spring 16 and the opener spring 17 is set to a value smaller than the driving force of the DC motor 5, the opening degree position VTP of the throttle valve 1 greatly changes even when the current flowing through the DC motor 5 varies slightly.

Next, a flow for turning the throttle valve 1 of the electronic throttle control apparatus according to this embodiment from the full-close position toward the opening side by a predetermined opening degree to control the throttle valve 1 to be at a desired opening degree position is described.

Figure 6:
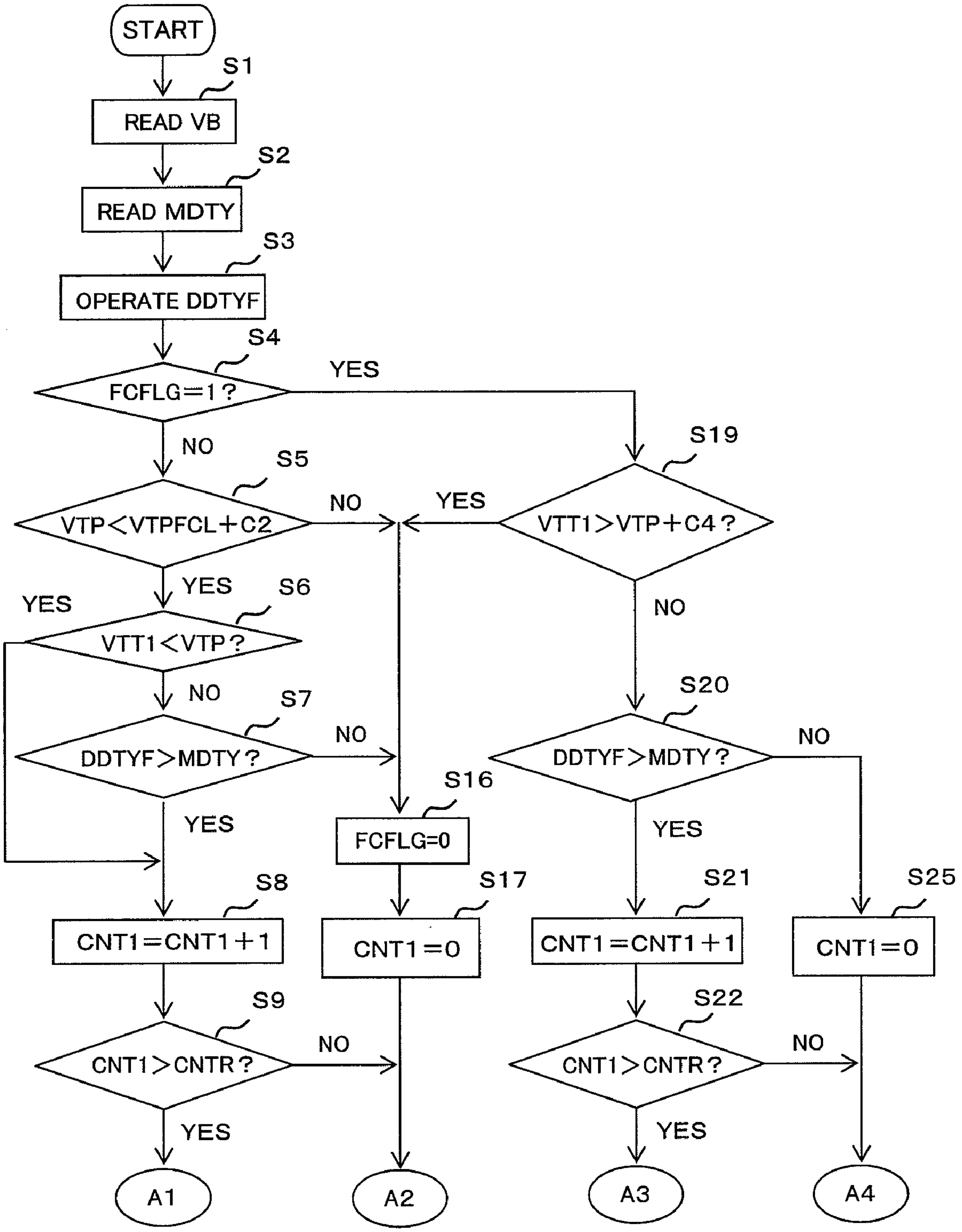
FIG. 6 is a flowchart illustrating a first half of a flow for turning the throttle valve of the electronic throttle control apparatus of FIG. 1 from a full-close position toward an opening side by a predetermined opening degree to control the throttle valve to be placed in a desired opening degree position.
Figure 7:
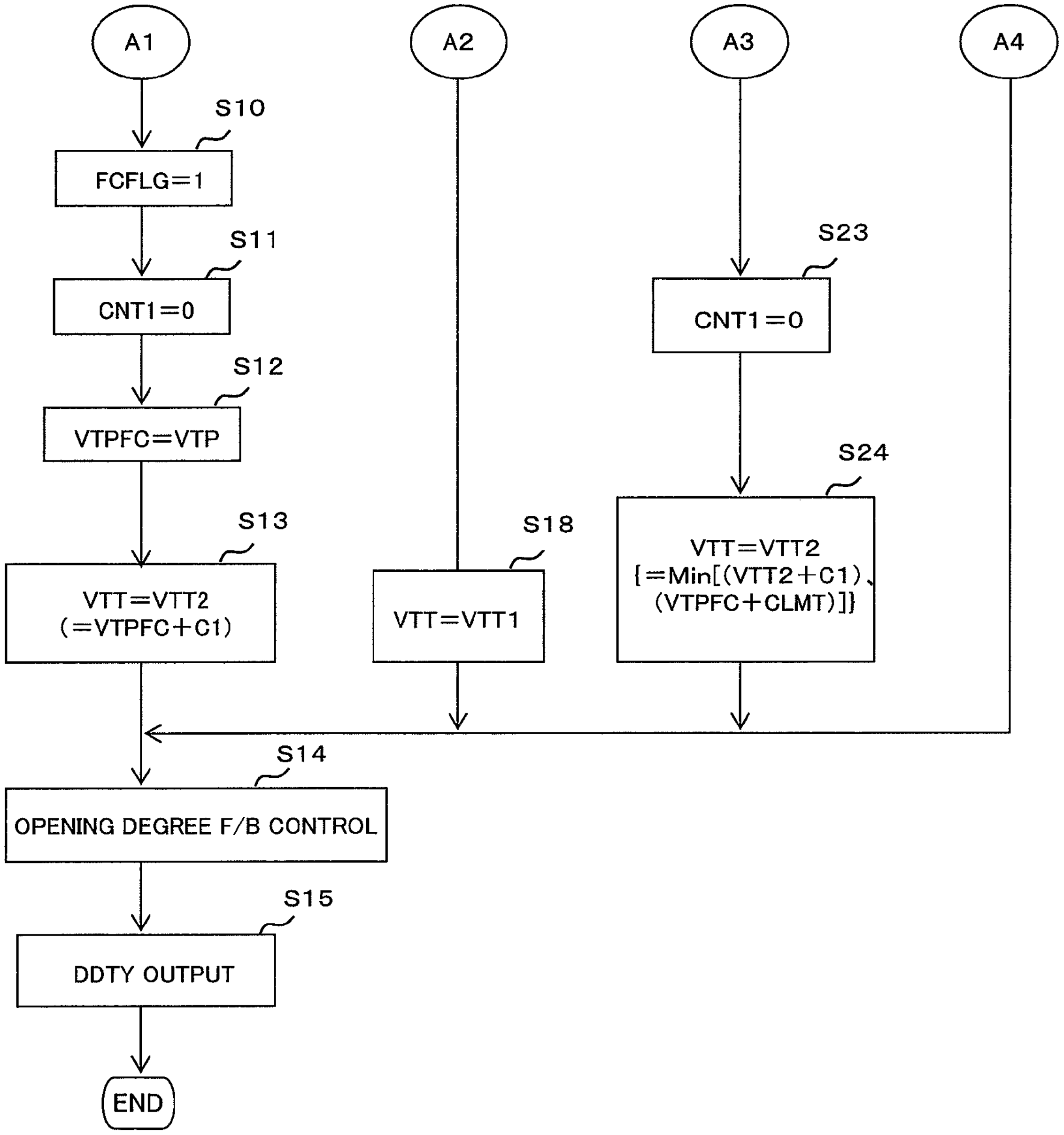
FIG. 7 is a flowchart illustrating a second half of the flow for turning the throttle valve of the electronic throttle control apparatus of FIG. 1 from the full-close position toward the opening side by the predetermined opening degree to control the throttle valve to be placed in the desired opening degree position.

FIGS. 6 and 7 are flowcharts illustrating the flow for turning the throttle valve 1 of the electronic throttle control apparatus in FIG. 1 from the full-close position toward the opening side by a predetermined opening degree to control the throttle valve 1 to be at a desired opening degree position.

Each processing is performed for each predetermined cycle (5 ms) in the electronic throttle control apparatus according to this embodiment.

It is apparent that the predetermined cycle is not limited to 5 ms.

First, the voltage value VB of the battery, which has been input to the electronic control unit 14, is input to the microcomputer 13 through the A/D converter (Step S1). Based on the voltage value VB of the battery, the throttle valve full-close position judgment means 9 reads the monitor duty value MDTY preset in the table (Step S2).

Next, after the motor drive duty value DDTY output from the throttle opening degree feedback control means 11 passes through the filter to reduce noise, the filtered duty value DDTYF is obtained (Step S3). The filtered duty value DDTYF is input to the throttle valve full-close position judgment means 9.

Next, the throttle valve full-close position judgment means 9 judges whether or not it has already been judged that the throttle valve 1 is being urged in the direction to be closed at the full-close position (Step S4).

When it is judged in Step S4 that it has not been judged that the throttle valve 1 is being urged in the direction to be closed at the full-close position (the full-close urging judgment flag FCFLG=0), the throttle valve full-close position judgment means 9 judges whether or not the opening degree position VTP detected by the throttle opening degree sensor 3 is smaller than a position of added opening degree obtained by adding the second predetermined opening degree C2 (50 mV) to the throttle full-close position learning value VTPFCL (Step S5).

On the other hand, when it is judged in Step S4 that it has already been judged that the throttle valve 1 is being urged in the direction to be closed at the full-close position (the full-close urging judgment flag FCFLG=1), the throttle valve full-close position judgment means 9 judges whether or not the first target opening degree position VTT1 is larger than a switching opening degree position obtained by adding a fourth predetermined opening degree C4 (15 mV) to the opening degree position VTP (Step S19).

When it is judged in Step S5 that the opening degree position VTP is smaller than the position of added opening degree obtained by adding the second predetermined opening degree C2 to the throttle full-close position learning value VTPFCL (VTP<VTPFC+C2), the throttle valve full-close position judgment means 9 judges whether or not the first target opening degree position VTT1 is smaller than the opening degree position VTP (Step S6).

When it is judged in Step S6 that the first target opening degree position VTT1 is smaller than the opening degree position VTP (VTT1<VTP), the throttle valve full-close position judgment means 9 increments the value of the counter CNT1 which counts a full-close urging state (CNT1=CNT1+1) (Step S8).

On the other hand, when it is judged in Step S6 that the first target opening degree position VTT1 is larger than the opening degree position VTP (VTT1>VTP), the throttle valve full-close position judgment means 9 judges whether or not the filtered duty value DDTYF is larger than the monitor duty value MDTY (Step S7).

When it is judged in Step S7 that the filtered duty value DDTYF is larger than the monitor duty value MDTY (DDTYF>MDTY), it is judged that an overcurrent is supplied to the DC motor 5. Then, the process proceeds to Step S8.

On the other hand, when it is judged in Step S7 that the filtered duty value DDTYF is smaller than the monitor duty value MDTY (DDTYF<MDTY), the throttle valve full-close position judgment means 9 judges that the throttle valve 1 is not being urged in the direction to be closed at the full-close position, and therefore sets the full-close urging judgment flag FCFLG to 0 (Step S16).

After the value of the counter CNT1 is incremented in Step S8, the throttle valve full-close position judgment means 9 judges whether or not the value of the counter CNT1 is equal to or larger than a predetermined value CNTR (Step S9).

When it is judged in Step S9 that the value of the counter CNT1 is larger than the predetermined value CNTR (CNT1>CNTR), the throttle valve full-close position judgment means 9 judges that the overcurrent is supplied to the DC motor 5 to cause the throttle valve 1 to be urged in the direction to be closed at the full-close position. Then, the full-close urging judgment flag FCFLG becomes 1 (Step S10).

On the other hand, when it is judged in Step S9 that the value of the counter CNT1 is smaller than the predetermined value CNTR (CNT1<CNTR), the throttle valve full-close position judgment means 9 causes the target opening degree position switching means 12 to output the first target opening degree position VTT1 input from the first target opening degree position setting means 7 to the throttle opening degree feedback control means 11 (Step S18).

After the full-close urging judgment flag FCFLG becomes 1 in Step S10, the value of the counter CNT1 becomes zero (Step S11).

Next, the opening degree position VTP at this time is set as the detected full-close position VTPFC of the throttle valve 1 (Step S12). The second target opening degree position setting means 8 sets the second target opening degree position VTT2 obtained by adding the first predetermined opening degree C1 to the detected full-close position VTPFC.

Next, the throttle valve full-close position judgment means 9 outputs a switching signal to the target opening degree position switching means 12, which then outputs the second target opening degree position VTT2 input from the second target opening degree position setting means 8 to the throttle opening degree feedback control means 11 (Step S13).

Further, the throttle opening degree feedback control means 11 performs feedback control on the throttle valve 1 to match the opening degree position VTP of the throttle valve 1 and the second target opening degree position VTT2 with each other (Step S14), and then outputs the motor drive duty value DDTY to the drive circuit 10 (Step S15).

When it is judged in Step S19 that the first target opening degree position VTT1 is larger than the switching opening degree position obtained by adding the fourth predetermined opening degree C4 to the opening degree position VTP (VTT1>VTP+C4), the process proceeds to Step S16.

On the other hand, when it is judged in Step S19 that the first target opening degree position VTT1 is smaller than the switching opening degree position obtained by adding the fourth predetermined opening degree C4 to the opening degree position VTP (VTT1<VTP+C4), the throttle valve full-close position judgment means 9 judges whether or not the filtered duty value DDTYF is larger than the monitor duty value MDTY (Step S20).

When it is judged in Step S20 that the filtered duty value DDTYF is larger than the monitor duty value MDTY (DDTYF>MDTY), the throttle valve full-close position judgment means 9 increments the value of the counter CNT1 (CNT1=CNT1+1) (Step S21).

On the other hand, when it is judged in Step S20 that the filtered duty value DDTYF is smaller than the monitor duty value MDTY (DDTYF<MDTY), the throttle valve full-close position judgment means 9 judges that the throttle valve 1 is not being urged in the direction to be closed at the full-close position, and therefore sets the full-close urging judgment flag FCFLG to 0 (Step S25). Then, the process proceeds to Step S14.

After the value of the counter CNT1 is incremented (CNT1=CNT1+1) in Step S21, the throttle valve full-close position judgment means 9 judges whether or not the value of the counter CNT1 is larger than the predetermined value CNTR (Step S22).

When it is judged in Step S22 that the value of the counter CNT1 is larger than the predetermined value CNTR (CNT1>CNTR), the value of the counter CNT1 becomes zero (Step S23).

Next, the second target opening degree position setting means 8 sets the smaller one of a value obtained by adding the first predetermined opening degree C1 to the second target opening degree position VTT2 and a first limit opening degree position obtained by adding the upper limit value CLMT for increasing the target opening degree to the detected full-close position VTPFC of the throttle valve 1 as the second target opening degree position VTT2.

Further, the target opening degree position switching means 12 outputs the second target opening degree position VTT2 to the throttle opening degree feedback control means 11 (Step S24). Then, the process proceeds to Step S14.

On the other hand, when it is judged in Step S22 that the value of the counter CNT1 is smaller than the predetermined value CNTR (CNT1<CNTR), the process proceeds to Step 14.

Figure 8:
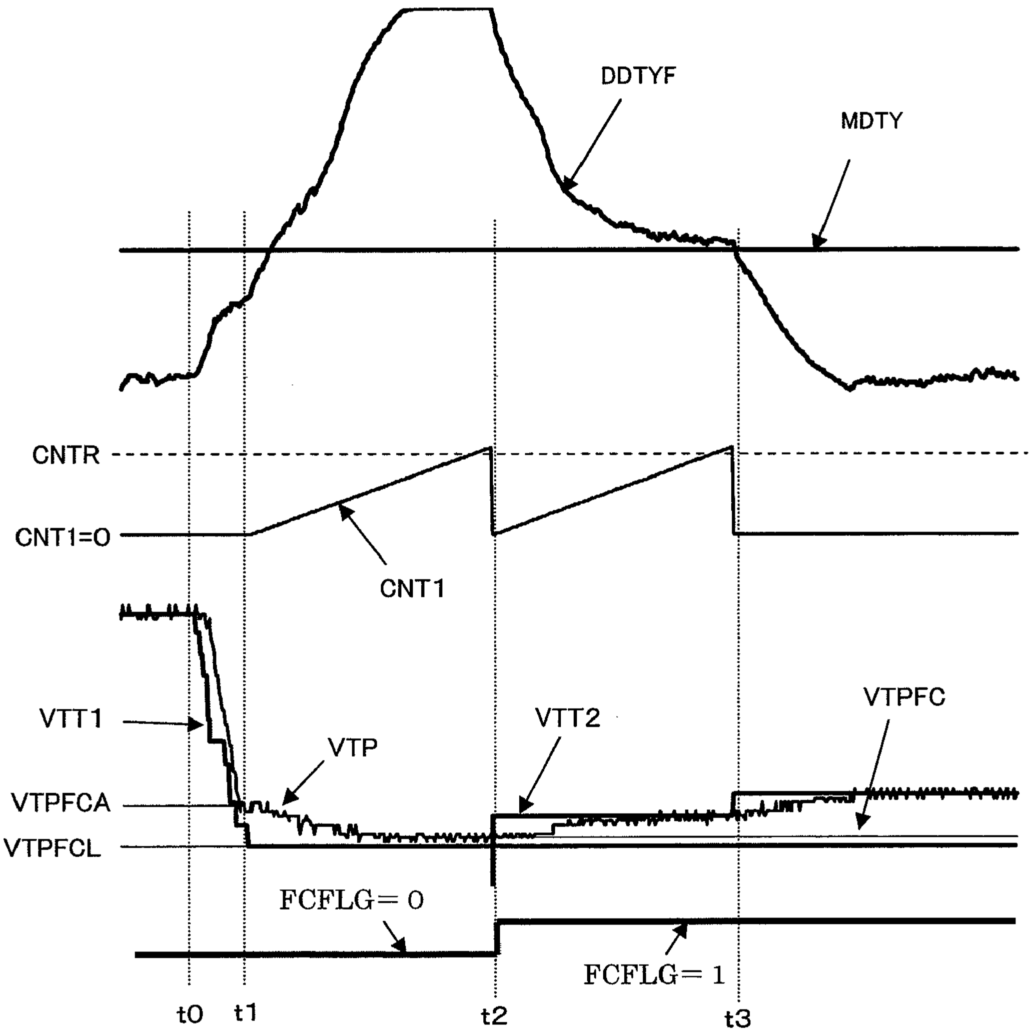
FIG. 8 is a time chart when the throttle valve of the electronic throttle control apparatus of FIG. 1 is turned from the full-close position toward the opening side by the predetermined opening degree to be controlled to be at the desired opening degree position.

FIG. 8 is a time chart when the throttle valve 1 of the electronic throttle control apparatus in FIG. 1 is turned from the full-close position toward the opening side by a predetermined opening degree to be controlled to be at a desired opening degree position.

In the case where an actual full-close position VTPFCA of the throttle valve 1 is shifted from the throttle full-close position learning value VTPFCL stored at the previous engine stop toward the opening side due to temperature characteristics of the throttle opening degree sensor 3, a force for urging the throttle valve 1 in the direction to be closed at the full-close position is applied when the accelerator opening degree signal varies to cause the first target opening degree position VTT1 to shift in the closing direction and to get closer to the throttle full-close position learning value VTPFCL.

At this time, an opening degree deviation corresponding to a difference between the first target opening degree position VTT1 and the opening degree position VTP detected by the throttle opening degree sensor 3 does not become 0. The filtered duty value DDTYF increases with the motor drive duty value DDTY to make the opening degree deviation zero.

The increase of the filtered duty value DDTYF causes the throttle valve 1 to press the full-close stopper 18. As a result, the full-close stopper 18 is bent to make the actual full-close position VTPFCA of the throttle valve 1 close to the vicinity of the throttle full-close position learning value VTPFCL.

When the throttle valve full-close position judgment means 9 judges at a time t1 that the first target opening degree position VTT1 is smaller than the opening degree position VTP for a predetermined period of time, the value of the counter CNT1 is incremented.

While the value of the counter CNT1 is being incremented, the opening degree deviation between the first target opening degree position VTT1 and the opening degree position VTP becomes 0 (equal to or smaller than a quantization level of the opening degree deviation in the microcomputer 13, for example, 1.2 mV or less). However, since the filtered duty value DDTYF is larger than the monitor duty value MDTY, the value of the counter CNT1 is continuously incremented.

When the value of the counter CNT1 reaches the predetermined value CNTR at a time t2, it is judged that the throttle valve 1 is being urged in the direction to be closed at the full-close position. Therefore, the full-close urging judgment flag becomes 1. Subsequently, the value of the counter CNT1 becomes zero.

At this time, the opening degree position VTP detected by the throttle opening degree sensor 3 is set as the detected full-close position VTPFC. The second target opening degree position setting means 8 sets the second target opening degree position VTT2 obtained by adding the first predetermined opening degree C1 to the detected full-close position VTPFC, and outputs the thus set second target opening degree position VTT2 to the target opening degree position switching means 12.

The target opening degree position switching means 12 outputs the second target opening degree position VTT2 input from the second target opening degree position setting means 8 to the throttle opening degree feedback control means 11 in response to the switching signal from the throttle valve full-close position judgment means 9.

The throttle opening degree feedback control means 11 performs the feedback control on the throttle valve 1 to match the opening degree position VTP with the second target opening degree position VTT2.

As a result, the opening degree position VTP gets closer to the second target opening degree position VTT2. However, the throttle valve 1 still presses the full-close stopper 18 to bend the full-close stopper 18, and the filtered duty value DDTYF is larger than the monitor duty value MDTY. Therefore, the value of the counter CNT1 is still continuously incremented.

Since the value of the counter CNT1 becomes equal to or larger than the predetermined value CNTR again at a time t3, the throttle valve full-close position judgment means 9 judges that the throttle valve 1 is being urged in the direction to be closed at the full-close position. Therefore, the value of the counter CNT1 becomes zero.

Further, the second target opening degree position setting means 8 sets the smaller one of the value obtained by adding the first predetermined opening degree C1 to the second target opening degree position VTT2 and the first limit opening degree position as the second target opening degree position VTT2.

In response to the switching signal from the throttle valve full-close position judgment means 9, the target opening degree position switching means 12 outputs the second target opening degree position VTT2 to the throttle opening degree feedback control means 11. As a result, the throttle opening degree feedback control means 11 performs the feedback control on the throttle valve 1 to match the opening degree position VTP and the second target opening degree position VTT2 with each other.

The opening degree position VTP moves toward the opening side. As a result, the throttle valve 1 is no longer urged in the direction to be closed at the full-close position, and the filtered duty value DDTYF becomes smaller than the monitor duty value MDTY. Thus, the overcurrent is prevented from being supplied to the DC motor 5.

As described above, according to the electronic throttle control apparatus according to this embodiment, when the throttle valve full-close position judgment means 9 judges that the throttle valve 1 is being urged in the direction to be closed at the full-close position, the throttle opening degree feedback control means 11 performs the feedback control on the throttle valve 1 to match the opening degree position VTP and the second target opening degree position VTT2 with each other. As a result, the throttle valve 1 is forcibly turned from the full-close position toward the opening side by the predetermined opening degree to be placed at the desired opening degree position.

As a result, the number of revolutions of the engine during idling can be reduced to improve fuel efficiency.

Moreover, the throttle valve full-close position judgment means 9 judges whether or not the throttle valve 1 is being urged in the direction to be closed at the full-close position when the opening degree position VTP is situated between the throttle full-close position learning value VTPFCL and the position of added opening degree obtained by adding the second predetermined opening degree C2 to the throttle full-close position learning value VTPFCL. Therefore, the state where the throttle valve 1 is urged in the direction to be closed at the full-close position can be judged without fail.

Moreover, the throttle valve full-close position judgment means 9 judges that the throttle valve 1 is being urged in the direction to be closed at the full-close position when the opening degree position VTP of the throttle valve 1 detected by the throttle opening degree sensor 3 is situated on the opening side of the first target opening degree position VTT1 for a predetermined period of time. Therefore, when the actual full-close position VTPFCA of the throttle valve 1 is shifted toward the opening side of the throttle full-close position learning value VTPFCL stored at the previous engine stop due to the temperature characteristics of the throttle opening degree sensor 3, the throttle valve full-close position judgment means 9 can judge the state where the throttle valve 1 is being urged in the direction to be closed at the full-close position without fail.

Moreover, the throttle valve full-close position judgment means 9 judges that the throttle valve 1 is being urged in the direction to be closed at the full-close position when the motor drive duty value DDTY output from the throttle opening degree feedback control means 11 is larger than the preset monitor duty value MDTY for a predetermined period of time. Therefore, the throttle valve full-close position judgment means 9 judges the state where the throttle valve 1 is being urged in the direction to be closed at the full-close position without fail when the throttle valve 1 is pressed by the full-close stopper 18 to be bent to make the opening degree deviation between the first target opening degree position VTT1 and the opening degree position VTP zero or the opening degree deviation fluctuates at the quantization level (±1 LSD) used for A/D conversion of the throttle opening degree signal to be negative and positive alternately.

Since the motor drive duty value DDTY output from the throttle opening degree feedback control means 11 is input to the throttle valve full-close position judgment means 9 after the noise is reduced by the filter, the state where the throttle valve 1 is being urged in the direction to be closed at the full-close position can be judged without fail even when the motor drive duty value DDTY fluctuates due to the noise.

Moreover, because the monitor duty value MDTY varies in response to the input voltage value VB of the battery, the state where the throttle valve 1 is being urged in the direction to be closed at the full-close position can be judged without fail even when the voltage value VB of the battery fluctuates.

The second target opening degree position setting means 8 further adds the first predetermined opening degree C1 to the second target opening degree position VTT2 when the signal input to the throttle opening degree feedback control means 11 is switched from the first target opening degree position VTT1 to the second target opening degree position VTT2 by the target opening degree position switching means 12 and the motor drive duty value DDTY is larger than the monitor duty value MDTY for a predetermined period of time. Therefore, the throttle valve 1 can be prevented from being urged in the direction to be closed at the full-close position to prevent the overcurrent from being supplied to the DC motor 5. At the same time, the throttle valve 1 can be turned from the full-close position toward the opening side by a predetermined opening degree to be placed in a desired opening degree position.

Moreover, because the second target opening degree position setting means 8 controls the second target opening degree position VTT2 to be on the closing side of the first limit opening degree position obtained by adding the upper limit value CLMT for increasing the target opening degree to the detected full-close position VTPFC, the throttle valve 1 can be prevented from opening from the full-close position beyond necessity.

Further, the target opening degree position switching means 12 switches the signal input to the throttle opening degree feedback control means 11 from the second target opening degree position VTT2 to the first target opening degree position VTT1 when the throttle opening degree feedback control means 11 performs feedback control on the throttle valve 1 to match the opening degree position VTP and the second target opening degree position VTT2 with each other and the first target opening degree position VTT1 is equal to or larger than the switching opening degree position obtained by adding the fourth predetermined opening degree C4 to the opening degree position VTP. Therefore, the throttle valve 1 is allowed to quickly follow the first target opening degree position VTT1 set in response to the signal output from the control means of the engine.

Second Embodiment

An electronic throttle control apparatus according to this embodiment further includes a temperature sensor (not shown) for measuring a temperature of cooling water of the engine.

Since the temperature of the DC motor 5 can be regarded as the same as the temperature of the cooling water of the engine, the temperature of the DC motor 5 is estimated from the temperature detected by the temperature sensor.

The throttle valve full-close position judgment means 9 calculates and estimates a motor current value IMC flowing through the DC motor 5 from a motor drive circuit resistance value of the DC motor 5 estimated from the temperature of the DC motor 5, which is estimated from the temperature detected by the temperature sensor, the voltage value of the battery, and the motor drive duty value DDTY.

The throttle valve full-close position judgment means 9 judges that the throttle valve 1 is being urged in the direction to be closed at the full-close position when the calculated motor current value IMC flowing through the DC motor 5 is equal to or larger than a predetermined value IMR for a predetermined period of time.

The other configurations are similar to those of the first embodiment.

Next, a flow for turning the throttle valve 1 of the electronic throttle control apparatus according to this embodiment from the full-close position toward the opening side by a predetermined opening degree to control the throttle valve 1 to be at a desired opening degree position is described.

Figure 9:
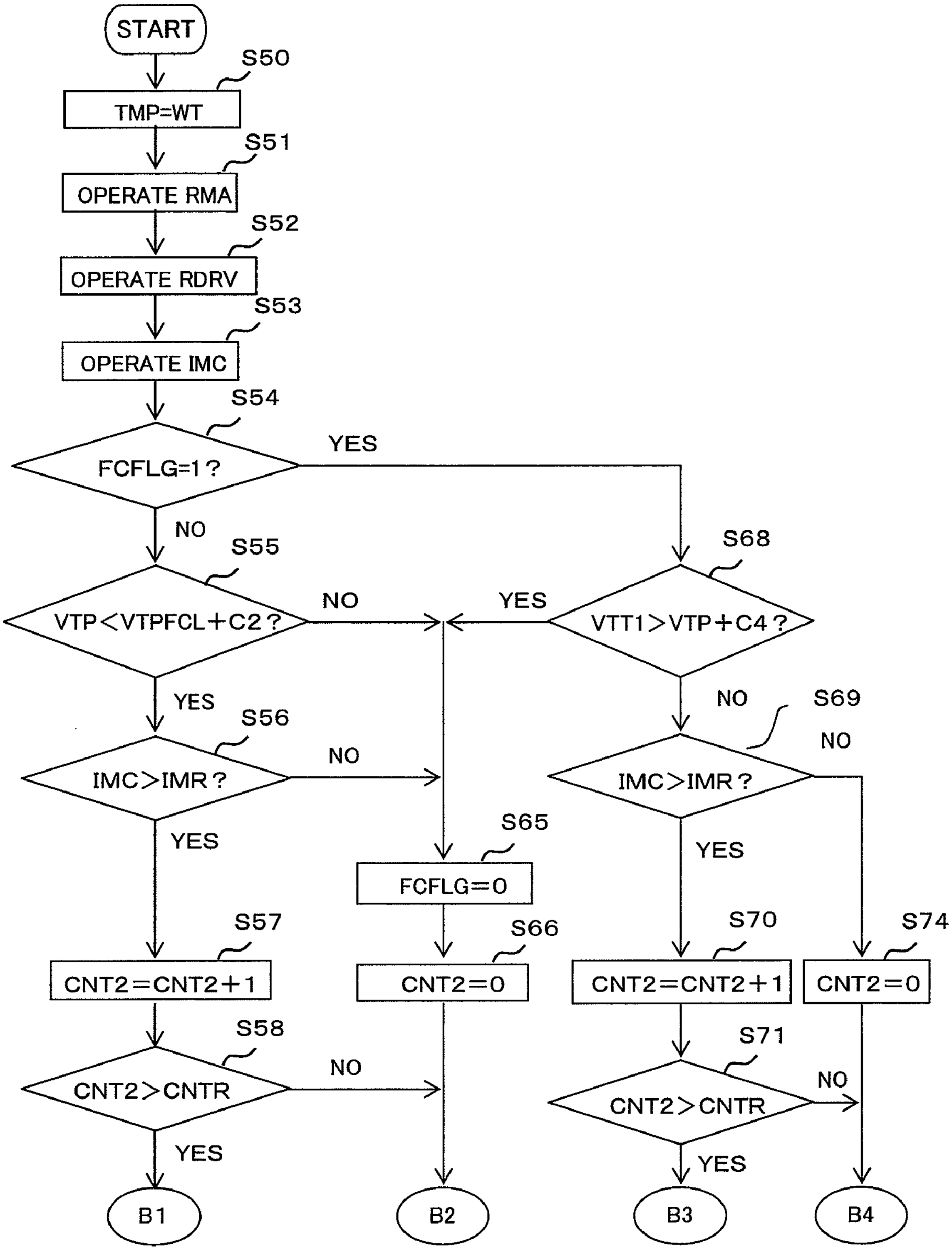
FIG. 9 is a flowchart illustrating a first half of a flow for turning a throttle valve of an electronic throttle control apparatus according to a second embodiment of the present invention from the full-close position toward the opening side by the predetermined opening degree to control the throttle valve to be placed in the desired opening degree position.
Figure 10:
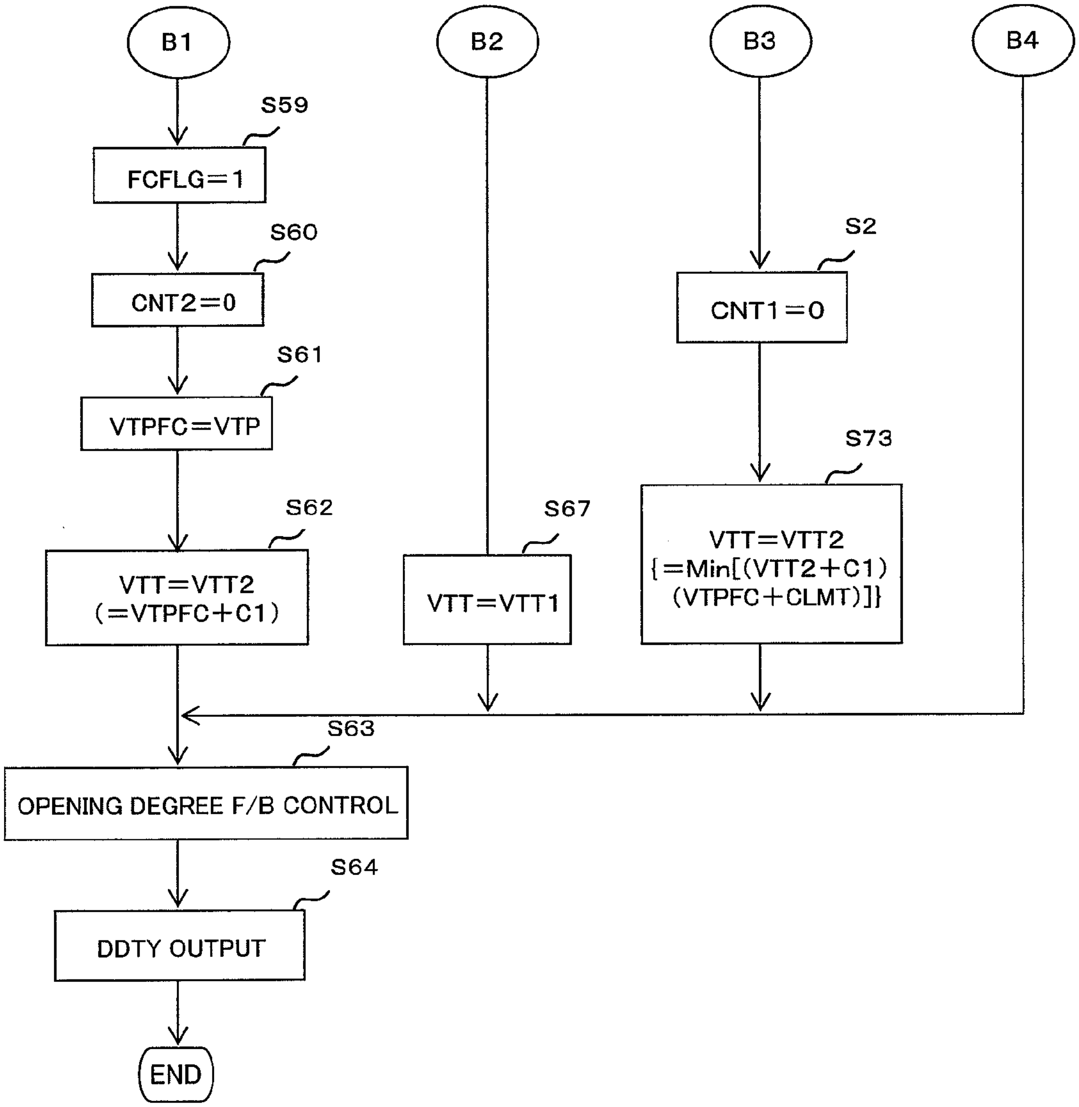
FIG. 10 is a flowchart illustrating a second half of the flow for turning the throttle valve of the electronic throttle control apparatus according to the second embodiment of the present invention from the full-close position toward the opening side by the predetermined opening degree to control the throttle valve to be placed in the desired opening degree position.

FIGS. 9 and 10 are flowcharts illustrating the flow for turning the throttle valve 1 of the electronic throttle control apparatus according to this embodiment from the full-close position toward the opening side by the predetermined opening degree to control the throttle valve 1 to be at the desired opening degree position.

First, the temperature sensor detects a cooling water temperature WT of the engine, and outputs a signal to the throttle valve full-close position judgment means 9 through the A/D converter.

The throttle valve full-close position judgment means 9 reads the cooling water temperature WT of the engine as a temperature parameter TMP (Step S50).

Next, the throttle valve full-close position judgment means 9 uses the temperature parameter TMP to calculate a motor winding resistance value RMA according to the following Formula (1) (Step S51).

$$RMA=Ktmp\times TMP+R0 \quad (1)$$

In the formula, Ktmp is a resistance temperature coefficient, and R0 is an offset resistance value.

Next, the throttle valve full-close position judgment means 9 adds the motor winding resistance value RMA, a preset motor harness resistance value RHN, and an ON resistance value RTR of a motor driver element to calculate and estimate a motor drive circuit resistance value RDRV (Step S52).

Next, the throttle valve full-close position judgment means 9 uses the voltage value VB of the battery, the motor drive duty value DDTY, and the motor drive circuit resistance value RDRV to calculate and estimate the motor current value IMC according to the following Formula (2) (Step S53).

$$IMC=\mathrm{VB}\times\mathrm{DDTY/RDRV} \quad (2)$$

Next, the throttle valve full-close position judgment means 9 judges whether or not it has already been judged that the throttle valve 1 is being urged in the direction to be closed at the full-close position (Step S54).

When it is judged in Step S54 that it has not been judged that the throttle valve 1 is being urged in the direction to be closed at the full-close position (the full-close urging judgment flag FCFLG=0), the throttle valve full-close position judgment means 9 judges whether or not the opening degree position VTP detected by the throttle opening degree sensor 3 is smaller than the position of added opening degree obtained by adding the second predetermined opening degree C2 (50 mV) to the throttle full-close position learning value VTPFCL (Step S55).

On the other hand, when it is judged in Step S54 that it has already been judged that the throttle valve 1 is being urged in the direction to be closed at the full-close position (the full-close urging judgment flag FCFLG=1), the throttle valve full-close position judgment means 9 judges whether or not the first target opening degree position VTT1 is larger than the switching opening degree position obtained by adding the fourth predetermined opening degree C4 to the opening degree position VTP (Step S68).

When it is judged in Step S55 that the opening degree position VTP is smaller than the position of added opening degree obtained by adding the second predetermined opening degree C2 to the throttle full-close position learning value VTPFCL (VTP<VTPFCL+C2), the throttle valve full-close position judgment means 9 judges whether or not the motor current value IMC is larger than the predetermined value IMR (Step S56).

When it is judged in Step S56 that the motor current value IMC is larger than the predetermined value IMR (IMC>IMR), the throttle valve full-close position judgment means 9 increments the value of the counter CNT1 which counts the full-close urging state (CNT1=CNT1+1) (Step S57).

On the other hand, when it is judged in Step S56 that the motor current value IMC is smaller than the predetermined value IMR (IMC<IMR), the throttle valve full-close position judgment means 9 judges that the throttle valve 1 is not being urged in the direction to be closed at the full-close position. Therefore, the full-close urging judgment flag FCFLG becomes 0 (Step S65).

After the value of the counter CNT1 is incremented in Step S57, the throttle valve full-close position judgment means 9 judges whether or not the value of the counter CNT1 is equal to or larger than a predetermined value CNTR (Step S58).

When it is judged in Step S58 that the value of the counter CNT1 is larger than the predetermined value CNTR (CNT1>CNTR), the throttle valve full-close position judgment means 9 judges that the overcurrent is supplied to the DC motor 5 to cause the throttle valve 1 to be urged in the direction to be closed at the full-close position. Then, the full-close urging judgment flag FCFLG becomes 1 (Step S59).

On the other hand, when it is judged in Step S58 that the value of the counter CNT1 is smaller than the predetermined value CNTR (CNT1<CNTR), in response to a switching signal output from the throttle valve full-close position judgment means 9, the target opening degree position switching means 12 outputs the first target opening degree position VTT1 input from the first target opening degree position setting means 7 to the throttle opening degree feedback control means 11 (Step S67).

After the full-close urging judgment flag FCFLG becomes 1 in Step S59, the throttle valve full-close position judgment means 9 sets the value of the counter CNT1 to zero (Step S60).

Next, the opening degree position VTP at this time is set as the detected full-close position VTPFC of the throttle valve 1 (Step S61). The second target opening degree position setting means 8 sets the second target opening degree position VTT2 obtained by adding the first predetermined opening degree C1 to the detected full-close position VTPFC.

Next, the throttle valve full-close position judgment means 9 outputs a switching signal to the target opening degree position switching means 12, which then outputs the second target opening degree position VTT2 input from the second target opening degree position setting means 8 to the throttle opening degree feedback control means 11 (Step S62).

Further, the throttle opening degree feedback control means 11 performs feedback control on the throttle valve 1 to match the opening degree position VTP of the throttle valve 1 and the second target opening degree position VTT2 with each other (Step S63), and then outputs the motor drive duty value DDTY to the drive circuit 10 (Step S64).

When it is judged in Step S68 that the first target opening degree position VTT1 is larger than a switching opening degree position obtained by adding the fourth predetermined opening degree C4 to the opening degree position VTP (VTT1>VTP+C4), the process proceeds to Step S65.

On the other hand, when it is judged in Step S19 that the first target opening degree position VTT1 is smaller than the switching opening degree position obtained by adding the fourth predetermined opening degree C4 to the opening degree position VTP (VTT1<VTP+C4), the throttle valve full-close position judgment means 9 judges whether or not the motor current value IMC is larger than the predetermined value IMR (Step S69).

When it is judged in Step S69 that the motor current value IMC is larger than the predetermined value IMR (IMC>IMR), the throttle valve full-close position judgment means 9 increments the value of the counter CNT1 which counts the full-close urging state (CNT1=CNT1+1) (Step S70).

On the other hand, when it is judged in Step S69 that the motor current value IMC is smaller than the predetermined value IMR (IMC<IMR), the throttle valve full-close position judgment means 9 judges that the throttle valve 1 is not being urged in the direction to be closed at the full-close position. Therefore, the full-close urging judgment flag FCFLG becomes 0 (Step S74). Then, the process proceeds to Step S63.

After the value of the counter CNT1 is incremented (CNT1=CNT1+1) in Step S70, the throttle valve full-close position judgment means 9 judges whether or not the value of the counter CNT1 is larger than the predetermined value CNTR (Step S71).

When it is judged that the value of the counter CNT1 is larger than the predetermined value CNTR (CNT1>CNTR), the value of the counter CNT1 becomes zero (Step S72).

Next, the second target opening degree position setting means 8 sets the smaller one of the value obtained by adding the first predetermined opening degree C1 to the second target opening degree position VTT2 and the first limit opening degree position obtained by adding the upper limit value CLMT for increasing the target opening degree to the detected full-close position VTPFC of the throttle valve 1 as the second target opening degree position VTT2.

Further, in response to a switching signal output from the throttle valve full-close position judgment means 9, the target opening degree position switching means 12 outputs the second target opening degree position VTT2 to the throttle opening degree feedback control means 11 (Step S73). Then, the process proceeds to Step S63.

On the other hand, when it is judged in Step S71 that the value of the counter CNT1 is smaller than the predetermined value CNTR (CNT1<CNTR), the process proceeds to Step S63.

The electronic throttle control apparatus according to this embodiment further includes the temperature sensor for measuring the temperature of the DC motor 5. The throttle valve full-close position judgment means 9 calculates the motor current value IMC flowing through the DC motor 5 from the motor drive circuit resistance value RDRV of the DC motor 5, which is estimated from the temperature detected by the temperature sensor, the voltage value VB of the battery, and the motor drive duty value DDTY output from the throttle opening degree feedback control means 11. Therefore, the motor current value IMC flowing through the DC motor 5 can be estimated with good accuracy while the throttle valve 1 is being urged in the direction to be closed at the full-close position.

Moreover, the temperature sensor measures the temperature of the DC motor 5 from the temperature of the cooling water of the engine. Since the motor drive circuit resistance value RDRV is calculated from the motor winding resistance value RMA estimated based on the temperature of the DC motor 5, the motor harness resistance value RHN, and the ON resistance value RTR of the motor driver element, the motor drive circuit resistance value RDRV can be estimated without additionally providing the temperature sensor.

Third Embodiment

The electronic throttle control apparatus according to this embodiment switches a signal to be input to the throttle opening degree feedback control means 11 for each of a first mode, a second mode, an engine failure state, and a normal running state. In the first mode, when a failure such as an open-circuit of the DC motor 5 occurs, the DC motor 5 is de-energized to fix the throttle valve 1 to the default opening stopper for save running. In the second mode, when a failure occurs in the first opening degree sensor section of the throttle opening degree sensor 3, a signal output from the second opening degree sensor section is output as the opening degree position VTP of the throttle valve 1 to the throttle opening degree feedback control means 11 for running.

In the case of the first mode running, the first target opening degree position setting means 7 sets the detected default opening degree position VTPDEF as the first target opening degree position VTT1.

In the case of the second mode running or the engine failure state, the first target opening degree position setting means 7 sets the larger one of the first target opening degree position VTT1 and a second limit opening degree position obtained by adding a fifth predetermined opening degree C5 (100 mV) to the throttle full-close position learning value VTPFCL as the first target opening degree position VTT1.

The other configurations are similar to those of the first embodiment.

Next, a flow for switching the signal to be input to the throttle opening degree feedback control means 11 of the electronic throttle control apparatus according to this embodiment is described.

Figure 11:
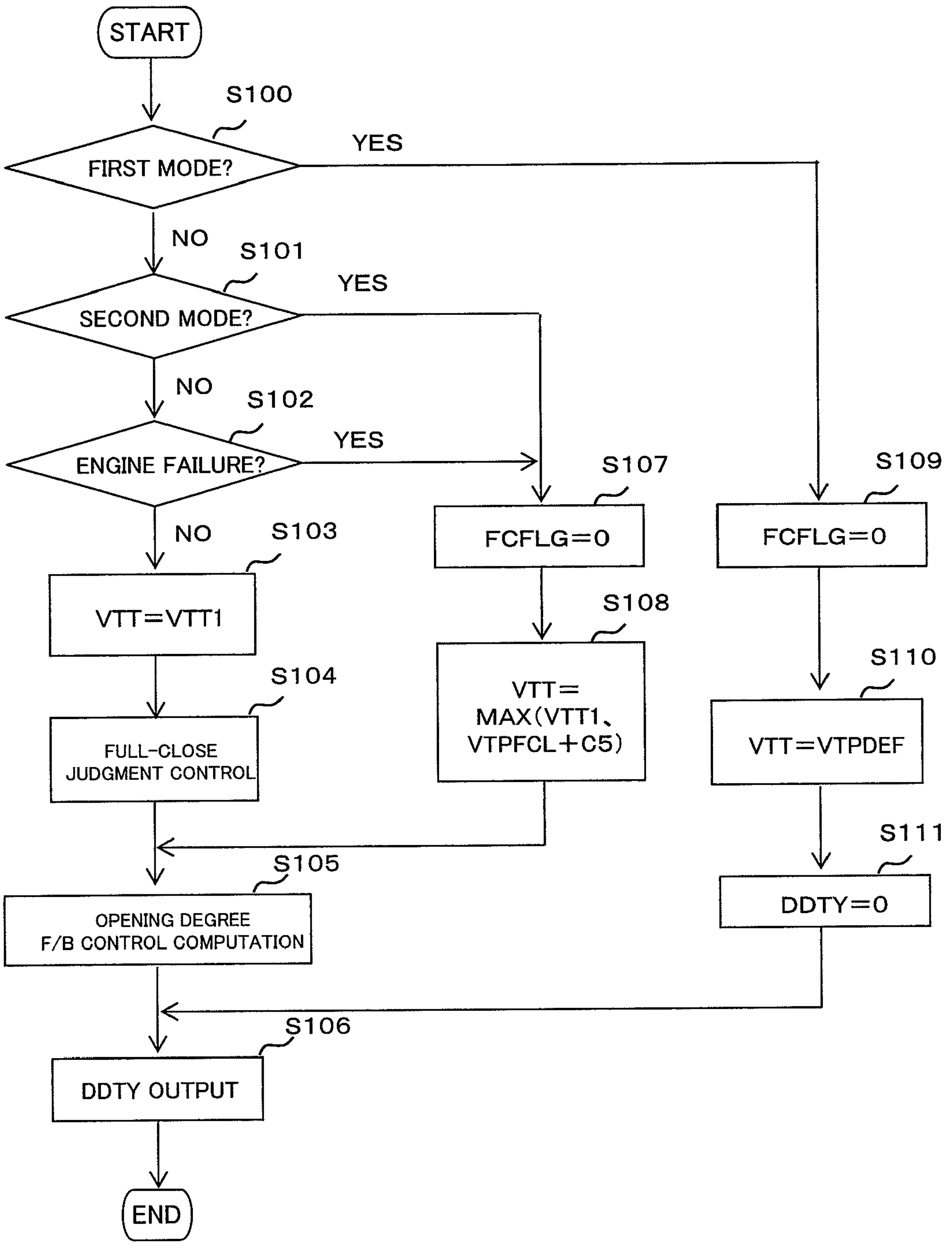
FIG. 11 is a flowchart illustrating a flow for switching a signal input to throttle opening degree feedback control means of an electronic throttle control apparatus according to a third embodiment of the present invention.

FIG. 11 is a flowchart illustrating the flow for switching the signal to be input to the throttle opening degree feedback control means 11 of the electronic throttle control apparatus according to this third embodiment.

First, the throttle valve full-close position judgment means 9 judges whether or not the running is performed in the first mode (Step S100).

When it is judged in Step S100 that the running is performed in the first mode, the throttle valve full-close position judgment means 9 sets the full-close urging judgment flag FCFLG to 0 (Step S109). The first target opening degree position setting means 7 sets the detected default opening degree position VTPDEF as the first target opening degree position VTT1. The target opening degree position switching means 12 outputs the thus set first target opening degree position VTT1 to the throttle opening degree feedback control means 11 (Step S110).

Next, the throttle valve full-close position judgment means 9 sets the motor drive duty value DDTY to 0 (Step S111). The throttle opening degree feedback control means 11 outputs the motor drive duty value DDTY to the drive circuit 10 (Step S106).

When it is judged in Step S100 that the running is not performed in the first mode, the throttle valve full-close position judgment means 9 judges whether or not the running is performed in the second mode (Step S101).

When it is judged in Step S101 that the running is performed in the second mode, the throttle valve full-close position judgment means 9 sets the full-close urging judgment flag FCFLG to 0 (Step S107).

Next, the first target opening degree position setting means 7 sets the larger one of the first target opening degree position VTT1 and the second limit opening degree position obtained by adding the fifth predetermined opening degree C5 (100 mV) to the throttle full-close position learning value VTPFCL as the first target opening degree position VTT1. The target opening degree position switching means 12 outputs the thus set first target opening degree position VTT1 to the throttle opening degree feedback control means 11 (Step S108).

Subsequently, the throttle opening degree feedback control means 11 performs the feedback control on the throttle valve 1 to match the opening degree position VTP of the throttle valve 1 and the larger one of the first target opening degree position VTT1 and the second limit opening degree position with each other (Step S105). Then, the process proceeds to Step S106.

When it is judged in Step S101 that the running is not performed in the second mode, the throttle valve full-close position judgment means 9 judges whether or not the engine failure state occurs (Step S102).

When it is judged in Step S102 that the engine failure state occurs, the process proceeds to Step S107.

On the other hand, when it is judged in Step S102 that the engine failure state does not occur, the first target opening degree position VTT1 is output by the target opening degree position switching means 12 to the throttle opening degree feedback control means 11 (Step S103). Then, as in the case of the electronic throttle control apparatus according to the first embodiment, it is judged whether or not the throttle valve 1 is being urged in the direction to be closed at the full-close position (Step S104), and the process proceeds to Step S105.

According to the electronic throttle control apparatus of this embodiment, when the engine failure occurs, the first target opening degree position VTT1 is restricted to be on the opening side of the second limit opening degree position obtained by adding the fifth predetermined opening degree C5 to the throttle full-close position learning value VTPFCL. Therefore, the throttle valve 1 can be prevented from being urged in the direction to be closed at the full-close position when the engine failure occurs.

Moreover, the throttle opening degree sensor 3 includes the first opening degree sensor section and the second opening degree sensor section. When the failure occurs in the first opening degree sensor section and the throttle opening degree feedback control means 11 performs the feedback control on the throttle valve 1 to match the opening degree position from the second opening degree sensor section and the first target opening degree position with each other, the first target opening degree position setting means 7 restricts the first target opening degree position VTT1 to be on the opening side of the second limit opening degree position obtained by adding the fifth predetermined opening degree C5 to the throttle full-close position learning value VTPFCL. Therefore, the throttle valve 1 can be prevented from being urged in the direction to be closed at the full-close position.

Moreover, the throttle valve full-close position judgment means 9 does not judge whether or not the throttle valve 1 is being urged in the direction to be closed at the full-close position when the DC motor 5 is de-energized for save running or the failure occurs in the second opening degree sensor section of the throttle opening degree sensor 3. Therefore, the throttle valve 1 can be prevented from being urged in the direction to be closed at the full-close position.

What is claimed is:

1. An electronic throttle control apparatus, comprising:

a throttle opening degree sensor that detects an opening degree position of a throttle valve which opens and closes to adjust an amount of air sucked into an engine;

a throttle actuator including a motor, the throttle actuator being for opening and closing the throttle valve by energization of the motor;

a first target opening degree position setting means that sets a first target opening degree position of the throttle valve in response to a signal from a control means of the engine;

a throttle opening degree feedback control means that receives an input of the opening degree position detected by the throttle opening degree sensor and an input of the first target opening degree position from the first target opening degree position setting means to perform feedback control on the throttle valve to match the opening degree position and the first target opening degree position with each other;

a throttle valve full-close position judgment means that judges whether or not the throttle valve is being urged in a direction to be closed at a full-close position;

a second target opening degree position setting means that sets a second target opening degree position obtained by adding a first predetermined opening degree to a detected full-close position detected by the throttle opening degree sensor when the throttle valve full-close position judgment means judges that the throttle valve is being urged in the direction to be closed at the full-close position; and a target opening degree position switching means that receives an input of the first target opening degree position from the first target opening degree position setting means and an input of the second target opening degree position from the second target opening degree position setting means to switch a signal to be input to the throttle opening degree feedback control means from the first target opening degree position to the second target opening degree position, wherein, when the throttle valve full-close position judgment means judges that the throttle valve is being urged in the direction to be closed at the full-close position, the throttle opening degree feedback control means performs the feedback control on the throttle valve to match the opening degree position and the second target opening degree position with each other by the target opening degree position switching means.

2. An electronic throttle control apparatus according to claim 1, wherein the throttle valve full-close position judgment means judges whether or not the throttle valve is being urged in the direction to be closed at the full-close position when the opening degree position is situated between a learned full-close position of the throttle valve detected by the throttle opening degree sensor when the throttle valve is at the full-close position, the learned full-close position being stored during stop of the engine, and a position of added opening degree obtained by adding a second predetermined opening degree to the learned full-close position.

3. An electronic throttle control apparatus according to claim 1, wherein the throttle valve full-close position judgment means judges that the throttle valve is being urged in the direction to be closed at the full-close position when the opening degree position of the throttle valve detected by the throttle opening degree sensor is on an opening side of the first target opening degree position for a predetermined period of time.

4. An electronic throttle control apparatus according to claim 1, wherein the throttle valve full-close position judgment means judges that the throttle valve is being urged in the direction to be closed at the full-close position when a motor drive duty value corresponding to a ratio of an ON time and an OFF time of a current flowing through the motor, the motor drive duty value being output from the throttle opening degree feedback control means, is larger than a preset monitor duty value for a predetermined period of time.

5. An electronic throttle control apparatus according to claim 1, further comprising a temperature sensor that measures a temperature of the motor, wherein the throttle valve full-close position judgment means judges that the throttle valve is being urged in the direction to be closed at the full-close position when a current value flowing through the motor calculated from a motor drive circuit resistance value of the motor estimated from the temperature detected by the temperature sensor, a voltage value of a battery, and a motor drive duty value corresponding to a ratio of an ON time and an OFF time of the current flowing through the motor, the motor drive duty value being output from the throttle opening degree feedback control means, is equal to or larger than a predetermined value for a predetermined period of time.

6. An electronic throttle control apparatus according to claim 5, wherein:

the temperature sensor measures the temperature of the motor from a temperature of cooling water of the engine; and the motor drive circuit resistance value is calculated from a motor winding resistance value estimated based on the temperature of the motor, a motor harness resistance value, and an ON resistance value of a motor driver element.

7. An electronic throttle control apparatus according to claim 4, wherein the motor drive duty value output from the throttle opening degree feedback control means is input to the throttle valve full-close position judgment means after noise is reduced by a filter.

8. An electronic throttle control apparatus according to claim 4, wherein the monitor duty value varies in response to an input voltage value of the battery.

9. An electronic throttle control apparatus according to claim 4, wherein the second target opening degree position setting means further adds the first predetermined opening degree to the second target opening degree position when the signal input to the throttle opening degree feedback control means is switched from the first target opening degree position to the second target opening degree position by the target opening degree position switching means and the motor drive duty value is larger than the monitor duty value for a predetermined period of time.

10. An electronic throttle control apparatus according to claim 9, wherein the second target opening degree position setting means restricts the second target opening degree position to be on a closing side of a first limit opening degree position obtained by adding a third predetermined opening degree to the detected full-close position.

11. An electronic throttle control apparatus according to claim 1, wherein the target opening degree position switching means switches the signal input to the throttle opening degree feedback control means from the second target opening degree position to the first target opening degree position when the throttle opening degree feedback control means performs the feedback control on the throttle valve to match the opening degree position and the second target opening degree position with each other and the first target opening degree position is equal to or larger than a switching opening degree position obtained by adding a fourth predetermined opening degree to the opening degree position.

12. An electronic throttle control apparatus according to claim 1, wherein the first target opening degree position setting means restricts the first target opening degree position to be on an opening side of a second limit opening degree position obtained by adding a fifth predetermined opening degree to the detected full-close position when an engine failure occurs.

13. An electronic throttle control apparatus according to claim 1, wherein:

the throttle opening degree sensor includes a first opening degree sensor section and a second opening degree sensor section, each being for detecting the opening degree position of the throttle valve; and the first target opening degree position setting means restricts the first target opening degree position to be on an opening side of a second limit opening degree position obtained by adding a fifth predetermined opening degree to the detected full-close position when a failure occurs in the first opening degree sensor section and the throttle opening degree feedback control means performs the feedback control on the throttle valve to match the opening degree position from the second opening degree sensor section and the first target opening degree position with each other.

14. An electronic throttle control apparatus according to claim 1, wherein the throttle valve full-close position judgment means avoids judging whether or not the throttle valve is being urged in the direction to be closed at the full-close position any one of when the motor is de-energized for save running and when a failure occurs in the throttle opening degree sensor.

* * * * *